United States Patent [19]
Gunjima et al.

[11] Patent Number: 5,162,934
[45] Date of Patent: Nov. 10, 1992

[54] METHOD OF MANUFACTURING LIQUID CRYSTAL DISPLAY ELEMENT

[75] Inventors: Tomoki Gunjima; Hiroshi Kumai; Satoshi Niiyama, all of Yokohama, Japan

[73] Assignee: Asahi Glass Company Ltd., Tokyo, Japan

[21] Appl. No.: 854,762

[22] Filed: Mar. 20, 1992

Related U.S. Application Data

[63] Continuation of Ser. No. 554,874, Jul. 20, 1990, abandoned.

[30] Foreign Application Priority Data

Jul. 31, 1989 [JP] Japan .................. 1-196953

[51] Int. Cl.⁵ .............................................. G02F 1/13
[52] U.S. Cl. ........................................ 359/80; 359/51; 359/94; 359/102; 430/20
[58] Field of Search ................. 350/331 R, 334, 343, 350/344, 347 E, 347 V; 359/51, 80, 81, 94, 102; 430/20; 428/1

[56] References Cited

U.S. PATENT DOCUMENTS

| | | | |
|---|---|---|---|
| 3,866,313 | 2/1975 | Yih | 350/343 |
| 4,435,047 | 3/1984 | Fergason | 350/334 |
| 4,626,303 | 12/1986 | Ogura | 350/343 |
| 4,671,618 | 6/1987 | Wu et al. | 350/347 V |
| 4,673,255 | 6/1987 | West et al. | 350/347 V |
| 4,682,858 | 7/1987 | Kanbe et al. | 350/334 |
| 4,685,771 | 8/1987 | West et al. | 350/347 V |
| 4,688,900 | 8/1987 | Doane et al. | 350/347 V |
| 4,691,995 | 9/1987 | Yamazaki et al. | 350/343 |
| 4,818,070 | 4/1989 | Gunjima et al. | 350/347 V |
| 4,820,025 | 4/1989 | Nakanowatari | 350/343 |
| 4,834,509 | 5/1989 | Gunjima et al. | 350/347 V |
| 4,973,138 | 11/1990 | Yamazaki et al. | 350/344 |

FOREIGN PATENT DOCUMENTS

| | | | |
|---|---|---|---|
| 312028 | 4/1989 | European Pat. Off. | 350/334 |
| 58-49853 | 11/1983 | Japan | 350/334 |
| 58-219532 | 12/1983 | Japan | 350/334 |
| 59-57221 | 4/1984 | Japan | 350/343 |
| 60-169831 | 9/1985 | Japan | 350/344 |
| 63-261222 | 10/1988 | Japan | 350/334 |
| 1-91112 | 4/1989 | Japan | 350/334 |

Primary Examiner—Rolf Hille
Assistant Examiner—Minhloan Tran
Attorney, Agent, or Firm—Oblon, Spivak, McClelland, Maier & Neustadt

[57] ABSTRACT

A method of manufacturing a liquid crystal display element comprising a pair of substrates and a liquid crystal composition injected into and cured in an evacuated cell constituted with the substrates, wherein the degree of vacuum in the cell is from 0.5 to 10 mm Hg, the composition forms a liquid crystal and polymer composite in which the nematic liquid crystal is dispersed and held in the resin matrix, and light transparent-scattering states are attained by agreement and disagreement between the refraction index of the liquid crystal and the refractive index of the resin matrix under control of an electric field applied across the electrodes. Residual bubbles left in the cell are disposed in the peripheral portion not constituting the display portion or in the pocket portion formed integrally to the peripheral portion.

20 Claims, No Drawings

METHOD OF MANUFACTURING LIQUID CRYSTAL DISPLAY ELEMENT

This is a continuation of application Ser. No. 07/554,874, filed on Jul 20, 1990, now abandoned.

BACKGROUND OF THE INVENTION

1. FIELD OF THE INVENTION

The present invention concerns a method of manufacturing a liquid crystal display element.

2. DISCUSSION OF BACKGROUND

Liquid crystal displays have been utilized generally in recent years for various domestic electric products, portable electronic calculators, watches, word processors, hand-held computers, portable TV sets, etc. while utilizing advantageous features of low power consumption, low voltage driving, etc.

In nematic liquid crystal of a structure put between a pair of substrates provided with electrodes, liquid crystal molecules are arranged in perpendicular to the surface of the substrates or arranged in a twisted state depending on voltage application conditions. A twisted nematic (TN) type liquid crystal display element for conducting display by putting liquid crystal between a pair of polarization plates has generally been employed by utilizing such a difference in the optical property.

On the other hand, it has also been proposed in recent years to put a liquid, crystal and polymer composite between a pair of substrates provided with electrodes by using the liquid crystal and polymer composite in which liquid crystal is dispersed and maintained in a resin matrix.

In this case, nematic liquid crystal is dispersed and held in the resin matrix in the liquid crystal-polymer composite, so that the refractive index of the resin matrix substantially agrees with the ordinary refractive index ($n_0$) of liquid crystal used.

Since liquid crystal is oriented substantially in parallel with the wall surface to which it is dispersed in the usual state, i.e., in a state not applied with a voltage in the liquid crystal and polymer composite, the refractive index is different from that of the resin matrix and light is scattered at the interface to provide a scattered (opaque) appearance.

When a voltage is applied between a pair of substrates provided with electrodes, since the liquid crystal turn-up substantially in perpendicular to the surface of the electrodes, the refractive index of the resin matrix substantially agrees with the ordinary refractive index of the liquid crystal used to provide a light transparent state.

Various kinds of displays are thus enabled by utilizing the optical difference.

A liquid crystal display element using such a liquid crystal and polymer composite has a merit capable of easily preparing a large area display body and is expected for light controlling application use. Further, since polarization plates are no more required, it also has a merit capable of obtaining bright display.

In a liquid crystal display element using such a liquid crystal and polymer composite, a mixture of nematic liquid crystal and curable compound is usually used, which is supplied to one of the substrates provided with an electrode and the curing compound is cured before or after overlaying the other of the substrates. Thus, the nematic liquid crystal is dispersed and held in the resin matrix.

As a specific example, there is a manufacturing method of mixing nematic liquid crystal with an aqueous solution of polyvinyl alcohol, casting to supply a mixture in which the nematic liquid crystal is dispersed in the aqueous solution of polyvinyl alcohol on one of the substrates equipped with an electrode, evaporizing water and curing polyvinyl alcohol, thereby forming a liquid crystal and polymer composite in which the nematic liquid crystal is dispersed in the polyvinyl alcohol matrix and overlaying the other of the substrates thereover, to obtain a liquid crystal display element.

Further, there is also a method of manufacturing a liquid crystal display element by mixing nematic liquid crystal and light curable acrylic resin material into a solution, casting to supply the solution on one of the substrates provided with an electrode, laying the other of the substrates thereover, using the light curable acrylic resin material under the irradiation of light and forming a liquid crystal and polymer composite in which the nematic liquid crystal is dispersed in the acrylic resin.

In the case of a light controlling body using an entirely deposited electrode, such a manufacturing method has a merit of providing an extremely high productivity even for a liquid crystal display element having a large area.

However, in the case for the application use of a display element in which the aligning accuracy is important between upper and lower substrates, the foregoing manufacturing method involves a problem in the alignment can not be attained easily but often causes displacement.

In view of the above, there may be considered to use a manufacturing method as employed in conventional TN type liquid crystal display elements in which a cell is formed and liquid crystal is injected under a reduced pressure therein, but this involves a problem that desired characteristics of the liquid crystal display element can not be obtained easily by merely injecting the liquid crystal under the reduced pressure.

SUMMARY OF THE INVENTION

The present invention has been achieved for overcoming the foregoing problems and the invention provides a method of manufacturing a liquid crystal display element, which comprises sealing a pair of substrates provided with electrodes at the periphery thereof excepting for an injection port to prepare a cell, containing the cell in a vessel, reducing the pressure at the inside of the vessel and then injecting a liquid crystal composition through the injection port by utilizing the difference of the pressure between the inside and the outside of the cell, wherein the degree of vacuum in the pressure-reduced status is from 0.5 to 10 mmHg, a mixture of nematic liquid crystal and a curable compound curing in a tightly closed atmosphere is used as the liquid crystal composition, the curable compound is cured after the injection of the liquid crystal composition to form a liquid crystal and polymer composite in which the nematic liquid crystal is dispersed and held in the resin matrix, and a light-transparent state is attained by agreement between the refractive index of the liquid crystal and the refractive index of the resin matrix and a light-scattering state is attained by disagreement between them, under control depending on the presence or absence of an electric field applied across the pair of electrodes.

The present invention further provides a method of manufacturing a liquid crystal display element, which comprises sealing a pair of substrates provided with electrodes at the periphery thereof excepting for an injection port to prepare a cell, containing the cell in a vessel, reducing the pressure at the inside of the vessel and then injecting a liquid crystal composition through the injecting a liquid crystal composition through the injection port by utilizing the difference of the pressure between the inside and the outside of the cell, wherein the degree of vacuum in the pressurereduced state is from 0.5 to 10 mmHg, a mixture of nematic liquid crystal and a curable compound curing in a tightly closed atmosphere is used as the liquid crystal composition, the curable compound is cured after the injection of the liquid crystal composition to form a liquid crystal and polymer composite is in which the nematic liquid crystal is dispersed and held in the resin matrix, and the refractive index of the matrix resin substantially agrees with the ordinary refractive index ($n_0$) of the liquid crystal used.

The present invention further provides a method of manufacturing a liquid crystal display element, which comprises sealing a pair of substrates provided with electrodes at the periphery thereof excepting for an injection port to prepare a cell, containing the cell is in a vessel, reducing the pressure at the inside of the vessel and then injecting a liquid crystal composition through the injection port by utilizing the difference of the pressure between the inside and the outside of the cell, wherein a mixture of nematic liquid crystal and a curable compound curing in a tightly closed atmosphere is used as the liquid crystal composition, the liquid crystal composition is injected, residual bubbles left in the cell are disposed in the peripheral portion not constituting the display portion and the curable compound is cured to form a liquid crystal and polymer composite in which residual bubbles are not present in the display portion and the nematic liquid crystal is dispersed and held in the resin matrix, and the refractive index of the resin matrix substantially agrees with the ordinary refractive index ($n_0$) of the liquid crystal used.

The present invention further provides a method of manufacturing a liquid crystal display element, which comprises sealing a pair of substrates provided with electrodes at the periphery thereof excepting for an injection port to prepare a cell, containing the cell in a vessel, reducing the pressure at the inside of the vessel and then injecting a liquid crystal composition through the injection port by utilizing the difference of the pressure between the inside and the outside of the cell, wherein a pocket portion is formed by outwardly bulging the seal in the non-display portion apart from the injection port, a mixture of nematic liquid crystal and a curable compound curing in a tightly sealed atmosphere is used as a liquid crystal composition, the liquid crystal composition is injected and, subsequently, the curable compound is cured while disposing the residual bubbles left in the cell to the pocket portion to form a liquid crystal and polymer composite in which the nematic liquid crystal is dispersed and held in the liquid matrix, and the light-transparent state is attained by agreement between the refractive index of the liquid crystal and the refractive index of the resin matrix and a light-scattering state is attained by disagreement between them under control depending on the presence or absence of an electric field applied across the pair of electrodes.

In the method of manufacturing the liquid crystal display element according to the present invention, since the cell is previously formed and the positional alignment of the substrates provided with electrodes can be conducted in the same manner as in the usual TN type liquid crystal display element, a rather precise positional alignment is enabled. Further, since the pressure reduction is set to low vacuum, the resin composition is less changed due to the evaporization of low boiling monomers, etc. in the injection mixture and, thus, the characteristics of the cured liquid crystal and polymer composite suffer from less changes.

Since the liquid crystal display element manufactured by the manufacturing method according to the present invention requires no alignment treatment, it can provide higher productivity than that of the conventional TN type liquid crystal display elements and, in addition, since the liquid crystal and polymer composite is in the form of a film after curing, it causes less troubles such as short-circuit between the substrates due to the pressurization applied thereto and abnormal alignment due to the displacement of spacers. In the liquid crystal display element manufactured according to the present invention, since transparent-scattering type liquid crystal and polymer composite is put between a pair of substrates provide with electrodes in which the nematic liquid crystal is dispersed and held in a resin matrix and the refractive index of the resin matrix substantially agrees with the ordinary refractive index of the liquid crystal used, it can provide an advantageous feature capable of easily obtaining bright display.

The liquid crystal and polymer composite in which the nematic liquid crystal is dispersed and held in the resin matrix may comprise a resin matrix having a plurality of fine process formed therein and liquid crystal filled in the pores, and it may be such a structure that the liquid crystal is encapsulated in liquid bubbles such as microcapsules, individual microcapsules are not necessarily dependent completely of each other or individual liquid bubbles of liquid crystal, may be in communication with each other by way of fine gaps like that in the porous structure.

A mixture constituting the liquid crystal and polymer composite used for the liquid crystal display device according to the present invention may be prepared by mixing nematic liquid crystal and a curable compound constituting the resin matrix into a mixed solution, which is then cured by means of light curing, heat curing or electron beam curing to separate the resin matrix and dispersing the nematic liquid crystal into the resin matrix. Further, it may be prepared by mixing and curing two component liquids or melting into a homogenous solution once by heating and then curing by cooling.

In this case, since the curing is conducted in the cell in a tightly closed state with the injection port being sealed or in a substantially closed state although the injection port not being sealed, any of curable compounds curing under a tightly sealed atmosphere may be used. Specifically, any of such materials may be used as requiring no removal of solvent and releasing no by-products or gases giving undesirable effects on curing.

In particular, the use of the light curable resin is preferred since curing is enabled in a short time with no effect the heat.

Further, additives not giving undesired effects on the performance of the present invention such as spacers, for example, ceramic particles, plastic particles or glass fibers for controlling the gaps between the substrates, pigment, dye, viscosity control agent, etc. may be added to the mixture of the uncured nematic liquid crystal and the curable compound forming the resin matrix.

In the present invention, the mixture of the nematic liquid crystal and the curable compound for forming the resin matrix is injected under a reduced pressure.

For the injection under the reduced pressure, a vessel capable of withstanding the reduced pressure while containing the liquid crystal cell at the inside thereof is used. A liquid crystal cell not yet injected with the mixture is disposed in the vessel and the pressure at the inside of the vessel is reduced finally 0.5 to 10 mmHg. Subsequently, the mixture of the nematic liquid crystal and the curable compound is brought into contact with the injection port, the reduced pressure state in the vessel is released and the mixture is injected into the liquid crystal cell by utilizing the difference of the pressure between the inside and the outside of the cell.

In this case, the mixture may be kept in contact with the injection port of the liquid crystal cell also during evacuation of the vessel. Further, the pressure reduced state may be released only partially or, on the other hand, a pressure higher than the atmospheric pressure may be applied by using a pressurizing gas.

Thus, a mixture of the nematic liquid crystal and the curable compound is injected to the inside of the liquid crystal cell.

In this case, it is important to reduce the degree of vacuum to 0.5 to 10 mmHg. If the pressure is reduced to such a high vacuum degree of 0.1 mmHg as in the case of usual TN type liquid crystal display elements, low boiling ingredients in the curable compound of the mixture, specifically, monomers are evaporated to change the resin composition and thus the refractive index of the resin matrix after curing, sometime failing to obtain desired transparent-scattering characteristics.

In view of the above, any of the ingredients contained, each by more than 5% by weight, in the curable compound desirable has a boiling point of higher than 60° C. under the degree of vacuum upon pressure reduction.

Evaporization of low boiling ingredients in the curable compound can be suppressed by providing material containing low boiling ingredients among the ingredients contained in the curable compound in a boat (or container), or reducing the pressure while supplying the gases thereof in the vessel. In a case of disposing such a boat, it is desirable that the surface area thereof in contact with the atmospheric air is made more than three times, particularly, more than five times as large as that of the surface area of the boat containing the injecting mixture in contact with the atmospheric air. For enlarging the surface area, the material containing low boiling ingredients, which may be of an identical composition with that of the injecting mixture, may be impregnated into a support of a large surface area such as a porous member or fibrous material such as fiber, paper or non-woven fabric.

If the vacuum degree upon injection is less than 10 mmHg, since the difference of the pressure between the inside and the outside of the cell is small, it takes a long time for injection. In particular, this trend becomes remarkable as the size of the cell is increased to a medium or large scale having the injection area in excess of 50 cm$^2$. Higher vacuum degree is therefore preferred in view of the productivity and it is appropriate to set the degree of vacuum to lower than 10 mmHg.

Thus, the vacuum is set to 0.5-10 mmHg in the present invention. Since gases remain in the cell under such a low vacuum degree, they tend to cause a phenomenon of leaving foam-like in which the mixture is not injected, i.e., so-called residual bubbles. With respect to the residual bubbles, there is a tendency that the lower the vacuum degree at the injection is, the larger the volume of the residual bubbles is. Accordingly, it is desirable that the vacuum degree is 10 mmHg or lower. In the present invention, undesirable residual bubbles as in the conventional TN type liquid crystal display elements are scarcely formed even under such a low vacuum degree. Usually, residual bubbles are not formed at the center of the cell but liable to be formed at the peripheral portion, in particular, at the end opposite to the injection port. Since the liquid crystal is present as a liquid form in the usual TN type liquid crystal display element, the residual bubbles move through the cell. Thus, if the bubbles are initially formed at the periphery as described above, they subsequently move through the cell. When the bubbles move to the display portion, they causes a drawback that display can not be taken place even if the voltage is applied. On the contrary, when the mixture of the nematic liquid crystal and the curable compound is injected and then the curable compound is cured to form a liquid crystal and polymer composite as in the liquid crystal display element of the present invention, the bubble, if they are formed, are not more movable. Therefore, if the compound is cured directly after the injection, since the bubbles are present at the peripheral portion, there is no worry that they give undesired effects on the display portion. For making it surer, curing may be conducted after confirming that the bubbles are not present in the display portion just before the curing. If the bubbles are present in the display portion, the bubbles are displaced to the peripheral portion, for example, by applying vibrations to the cell while tilting it obliquely or pressing the substrate surface of the cell with fingers and then the compound is cured after confirming that the bubbles are no more present in the display portion. In this way, the bubbles, if present, are fixed in the peripheral portion, which has no concerns with the display, and give no undesired effects on the display.

In this instance, a pocket portion may be formed by outwardly bulging a part of the seal of the cell. Specifically, one or plurality of pocket portions may be formed to the non-display portion remote from the injection port by outwardly bulging one or plurality portions of the seal. The shape of the pocket portion may be a rectangular, trapezoidal, arcuate or like other configuration opened at one end. The pocket portion may be formed at a position remote from the injection port and, usually, the pocket portion may be formed by outwardly bulging the seal at the end or the central portion of the side opposite to the injection port. Further, the pocket portion may also be formed to a position not at the opposite side but in an adjacent side at a portion near the side opposite to the injection port. Furthermore, it may be disposed at the each of the crossing points of four sides. In a case of forming a plurality of pocket portions, only a part of them may be disposed at a portion near the injection port.

The curable compound is cured while leaving the residual bubbles upon injection in the pocket portion. Also in this case, if bubbles are left in the portion other than the pocket upon injection, curing is conducted after moving the bubbles to the pocket portion.

Since the bubbles are not present in this way in the display portion, there is no undesired effect for the appearance and the operation of the liquid crystal display element. Further, since the residue of the bubbles is previously expected, injection is possible even if the degree of vacuum is low upon injection, which can eliminate the problem of evaporization of the curable compound and shorten the time required for injection.

The pocket portion may be entirely or partially removed by cutting after the curing. Opening in the seal formed by cutting is sealed as required. Since the outer configuration of the cell can be reduced by cutting to remove at least a part of the pocket portion, it is advantageous in view of mounting.

The effect becomes greatest in the case if the liquid crystal is present as closed liquid bubbles in the matrix of the curing product. Also in a case of porous matrix, since the matrix is minute, the liquid crystal is leaked out to the bubbles in such a small amount as causing display failure only at the periphery of the pocket portion. Since the display portion is not usually disposed at a portion in a direct adjacent with the seal but is spaced apart by about several millimeters to tens and several millimeters, the display failure scarcely prevails to the display portion.

Thus, even if it is required for the injection under low vacuum degree or in high-viscous status, this causes no problem of display failure or worsening of the productivity.

After the injection, the injection port is sealed if necessary. In the present invention, since the injected mixture is cured into a film-like liquid crystal and polymer composite, it does not leak through the injection port after curing. Accordingly, sealing for the injection port is not always required, but it is preferred to seal the injection port for eliminating undesired effects of external atmosphere in view of the durability. The injection port may be sealed before or after the cure of the mixture.

After the injection, the mixture of the injected nematic liquid crystal and the curing compound is cured. Specifically, the resin matrix is separated from the nematic liquid crystal upon curing by light curring, heat curing and electron beam curing, to form a liquid and polymer composite in which the nematic liquid crystal is dispersed in the resin matrix.

In a state where a voltage is not applied or applied but at such a low level as not turning up the liquid crystal, since the refractive index of the resin matrix (after curing) does not agree with the refractive index of the liquid crystal arranged substantially in parallel with the wall surface of the resin matrix, light is scattered (clouded). Then, if a voltage sufficient to turn-up the liquid crystal is- applied, since the refractive index of the resin matrix substantially agrees with the ordinary refractive index ($n_0$) of the liquid crystal turned-up substantially in perpendicular to the surface of the substrate provided with the electrode, the light transmits through the device.

Thus, the transparent-scattering state is changed depending on the state of the voltage applied, that is, the light transmits when the refractive index of the resin matrix agrees with that of the liquid crystal, while the light is scattered (clouded) when they do not agree with each other, thereby enabling display. The scattering property of the device is higher than that of the conventional DS (Dynamic scattering) mode liquid crystal display element thereby enabling to provide a display at a higher contrast ratio.

In the foregoings, explanations have been made to a mode in which the element is clouded in a state not applied with an electric field and made transparent in a state under the application of an electric field, but a reverse mode may also be utilized.

That is, it can be set such that the refractive index of the liquid crystal agrees with that of the resin matrix under the state of not applying the electric field to provide a transparent state, whereas they do not agree with the each other in a state of applying the electric field to provide a clouded state.

The response time of the liquid crystal display element using the liquid crystal and polymer composite in accordance with the present invention is faster than that of the conventional TN mode liquid crystal display elements, and electro-optical characteristics for the voltage-transmittance is relatively moderate as compared with that of the conventional TN mode liquid crystal display elements, and the driving for the gradational display is also easy.

The refractive index anisotropy $\Delta n$ ($=n_e - n_0$) of the liquid crystal contributes to the scattering property under non-electric field and it is preferred that the anisotropy is greater to some extent for obtaining high scattering property. Specifically, a preferred condition is: $\Delta n > 0.18$. Further, it is desirable that the ordinary refractive index $n_0$ of the liquid crystal used substantially agrees with the refractive index $n_p$ of the resin matrix, in which a high transparency is obtained under the application of an electric field. Specifically, it is preferred to satisfy the relationship: $n_0 - 0.03 < n_p < n_0 + 0.05$.

The average grain size of the liquid crystal dispersed and held in the resin matrix may be properly selected and used within a range from 0.1 to 3 $\mu$m depending on the purpose of use.

The gap between the substrates provided with electrodes may be within a range about from 5 to 50 $\mu$m, which can be determined properly while considering the scattering property, permeability, driving voltage, etc.

Further, for improving the scattering property under non-electric field, it is effective to increase the operable volume fraction $\phi$ of the liquid crystal in the liquid crystal and polymer composite. $\phi > 20\%$ is preferred and $\phi > 35\%$ is further preferred in order to provide higher scattering property. On the other hand, if $\phi$ is excessively large, the structural stability of the liquid crystal and polymer composite is worsened and $\phi > 70\%$ is preferred.

The liquid crystal display element according to the present invention shows a scattered state (clouded state) in a case where the electric field is not applied, due to the difference between the refractive index of the not-oriented liquid crystal and that of the resin matrix. In the case of using the liquid crystal display device as a projection type display apparatus, light is scattered at the portion electrode is not present and light does not reach a projection screen to provide a black view even if a light shielding film is not disposed at a portion other than the picture element area. Thus, shielding for the portion other than the picture element electrode by means of a light shielding film, etc. is no more necessary for preventing the light from leaking through the portion other than the picture element electrode and this can eliminate the fabrication step of forming the light shielding film.

An electric field is applied to a desired picture element or to the entire surface in a case of a light controlling device. At the picture element area applied with the electric field, the liquid crystal is oriented to provide a transparent state due to the agreement between the ordinary refractive index ($n_o$) of the liquid crystal and the refractive index ($n_p$) of the resin matrix, by which the opposite side can be seen-through.

Thus, display on the opposite side can be seen by transmission at the white background (scattering). For example, a picture can be seen if it is, disposed on the opposite side, or a blue appearance can be seen when the blue reflection plate is disposed. In a case of using the device as a projection type display apparatus, light transmits through the desired picture element to provide bright display at the projection screen, to obtain bright display on the dark background.

If curing is conducted while applying a sufficiently high voltage to only to a specific portion in the curing step, the portion is made always light transparent and, accordingly, such an ordinary transparent portion may be formed if a fixed display is desired. On the contrary, in the case of a applying to a device which is made transparent under the application of non-electric field, ordinary clouded portion is formed by a similar method.

The liquid crystal display element according to the present invention can conduct color display by disposing a color filter or can be formed into an active matrix liquid crystal display element by disposing an active element such as TFT, MIM element, PIN diode to each of the picture elements.

Further, color display may also be conducted by incorporating a dye or pigment into the liquid crystal and polymer composite.

For the liquid crystal display element according to the present invention, a vacant cell may be formed by using two substrates made of glass or plastic provided with an electrode made of ITO ($In_2O_3$—$SnO_2$) and sealing the periphery thereof with sealing material.

In this instance, an injection port is disposed to a portion of the seal or the substrate, through which a mixture of the nematic liquid crystal and the curable compound as the liquid crystal composition is injected.

The electrode disposed to the substrate is usually made as a transparent electrode as described above but a metal reflection electrode may be disposed or a low electric resistance metal lead may be disposed together to the transparent electrode or an active element such as TFT, diode or non-linear resistance element may be disposed as described above, depending on the application uses.

In addition, it is also possible for laminating an IR cut filter or UV cut filter or printing figures or graphics, or using a plurality sheets of liquid crystal display element.

Furthermore, in the present invention, a protection plate such as a glass plate or plastic plate may be laminated to the outside of the liquid crystal display element. This can reduce the breaking possibility to improve the safety even upon pressurizing the surface.

For the curable compound constituting the liquid crystal and polymer composite in accordance with the present invention, those resin materials curable within a tightly sealing system can be used and any of materials which are cured under heat, light, electron beam, etc. and are free from removal of solvent, by-product gases or other by-products.

Among them, light curable resin is preferably used in view of the productivity and monomer, oligomer, etc. thereof can be used. In particular, the light curable vinyl resin is preferably used. Specifically, a light cure acryl resin is exemplified and, in particular, a light curable acryl resin containing acryl oligomer polymerizable and curable under the irradiation of light is preferred.

In this case, the light cure initiator is also preferably composed of material less evaporizable under a reduced pressure and it is preferred to use a light cure initiator with a molecular weight of greater than 150. Specifically, there can be mentioned benzyl (dibenzoyl), benzoin, bezoinisobutyl ether and benzoin ethyl ether.

The liquid crystal used in the present invention is a nematic liquid crystal having positive dielectric anisotropy which is a liquid crystal having the ordinary refractive index ($n_o$) identical with the refractive index of the resin matrix. The liquid crystal may be used alone or as a composition but it can be said advantageous to use a composition for satisfying various performances required such as operation temperature range or working voltage.

The liquid crystal display element according to the present invention uses a liquid crystal and polymer composite and, therefore, causes less worry of short-circuitting between upper and lower transparent electrodes, in which bubbles, if formed, do not move and thus give no undesired effects on the display, ifs free from strict control for the orientation and the substrate gap as in usual TN type display elements, so that a liquid crystal display element capable of controlling the transparent state and scattered state can be produced at an extremely high productivity.

If the substrate is made of plastic or thin glass in the liquid crystal display element, it is preferred to further laminate a protection plate such as plastic or glass at the outer side for the protection.

The liquid crystal display device according to the present invention can be applied to usual devices for the display of numericals, letters or graphics, as well as to optical shutter, light transmittance variable device, television set, etc.

In the method of manufacturing the liquid crystal display element, the degree of vacuum is set to 0.5 to 10 mmHg, a mixture of the nematic liquid crystal and the curable compound is used as the liquid crystal composition and the liquid crystal composition is injected by utilizing the difference of the pressure between the inside and the outside of the cell.

Accordingly, since the cell is previously formed and positional alignment for the substrates provided with electrodes can be conducted like that in usual TN type liquid crystal display elements, a rather accurate positional alignment is possible. Further, since the degree of vacuum is set low, fluctuations of the resin composition due to the evaporization of low boiling monomers in the injecting mixture is less caused and, accordingly, variations of characteristics in the completed liquid crystal and polymer composite are less caused.

Further, since no orientation treatment is required, it can provide higher productivity than the usual TN type liquid crystal display elements and, since the liquid crystal and polymer composite is in the form of a film after curing, it causes less problem such as short-circuitting between the substrates caused by the pressurization to the substrate or the abnormal orientation due to the movement of the spacers.

In addition, the problem of the residual bubbles as experienced usual TN type liquid crystal display elements is scarcely caused even if the vacuum degree is low. In the present invention, when the curable compound is cured to form the liquid crystal and polymer composite, the bubbles, if any, are not moved and display failure due to the movement of the bubbles formed in the peripheral portion through the cell to the display portion is not caused.

By providing the pocket portion and curing the curable compound while leaving the residual bubbles upon injection, injection at low vacuum degree or in a short period of time is enabled. Since the bubbles are not present in the display portion in this way, they give no undesired effects on the appearance or on the operation of the liquid crystal display element.

The present invention will now be explained specifically by way of examples.

EXAMPLE 1

Identical glass substrates on which ITO electrodes were entirely formed were disposed such that the electrode surfaces are opposed to each other. Spacers of about 9.5 µm diameter were scattered at the inside and the peripheral portion thereof was sealed with an epoxy resin sealing material except for the injection port portion to manufacture a vacant cell with a substrate gap of 9.5 µm.

A liquid crystal composition was prepared by homogenously dissolving 19 parts of n-decyl acrylate and 19 parts of an acryl oligomer ('M-1200', manufactured by Toa Gosei Kagaku Co.) having a boiling point of higher than 60° C. at 1 mmHg, 0.38 parts of "Darocure 1116", manufactured by Merck Co as a light cure initiator and 62 parts of "E-8" manufactured by BDH Co. as the liquid crystal.

The vacant cell manufactured as described above and a liquid crystal composition boat putting the liquid crystal composition were disposed in a vessel capable of withstanding a reduced pressure and the inside of the vessel was evacuated down to 1 mmHg. Then, the injection port of the vacant cell was brought into contact with the liquid crystal composition in a liquid crystal composition boat and the vacuum in the vessel was released to cause pressure difference between the inside and the outside of the cell to inject the liquid crystal composition through the injection port into the vacant cell. Then, UV-rays were irradiated for 60 sec from an UV-ray irradiation device to cure the curable compound to manufacture a liquid crystal display element.

The thus prepared liquid crystal display element has no bubbles and was in an entirely clouded state. When an AC voltage at 50 Hz and 50 V was applied to the liquid crystal display element, the entire surface became transparent and transparent-scattering display was possible by the control of the voltage application.

A cell sealed so as to form a pocket portion at the end of the side opposite to the injection port was also manufactured. The pressure difference was caused between the inside and outside of the pocketted cell and the liquid crystal composition was injected through the injection port into the vacant cell. The injecting operation was completed after confirming that the injection was completed except for the pocket portion.

Depending on the cells, injection was completed also for the pocket portion but bubbles were left at other end portions. The injecting operation was continued until the volume of the bubbles become smaller than that of the pocket portion and the injecting operation was completed. In such cells, bubbles were moved to the pocket portion by wiping the portions including bubbles with fingers or by shaking the cells.

In the thus prepared liquid crystal display element, bubbles were not present except for the pocket portion and the entire surface was clouded. When an AC voltage at 50 Hz, 50V was applied to the liquid crystal element, the entire surface became transparent and, accordingly, transparent-scattering display was possible by the control of the voltage application.

When substantially the entire part of the pocket portion of the cell was removed by cutting from the base thereof after curing, the liquid crystal did not flow out since the curing was completed and transparent-scattering control was possible even without sealing the cut portion.

The liquid crystal display element sealed for the injection port and for the cut portion was excellent as compared with the liquid crystal display element with no such sealing in view of the reliability for long time use.

Similar effects were also obtained with liquid crystal display elements provided with the pocket portions at two positions on both ends of the side opposite to the injection port, provided with the pocket portions at 4 position in total at both ends of the side opposite to the injection port and at both ends of the side on the injection port, provided with the pocket portion at the position at the center of the side opposite to the injection port.

COMPARATIVE EXAMPLE 1 AND 2

Liquid crystal display elements were also manufactured in the same procedures as those in Example 1 except for setting the degree of vacuum to 20 mmHg (Comparative Example 1) to 0.1 mmHg (Comparative Example 2).

In the liquid crystal display element of the Comparative Example 1, a considerable amount of bubbles were left in the peripheral portion. In the liquid crystal display element of Comparative Example 2, since n-decyl acrylate in the composition of the resin, control for the refractive index was insufficient and the difference between the transparent-scattering states was small.

COMPARATIVE EXAMPLE 3

A liquid crystal display element was manufactured substantially in the same procedures as those in Example 1 except for using n-hexyl acrylate instead of n-decyl acrylate.

In the liquid crystal display element, since n-hexyl acrylate in the curable compound was partially evaporized to change the composition of the resin, control for the refractive index was insufficient and the difference between the transparent-scattering state was small.

COMPARATIVE EXAMPLE 4

A liquid crystal display element was manufactured substantially in the same procedures as those in Example 1 except for using acetophenone with a molecular weight of 120 as the light cure initiator.

In the liquid crystal display element, since light cure did not proceed sufficiently, the scattering performance was remarkably low.

EXAMPLE 2

A liquid crystal display element was manufactured in the same procedures as those in Example 1 except for using 9 parts of 2-hydroxyethyl acrylate and 9 parts of n-decyl acrylate instead of 19 parts of n-decyl acrylate and setting the degree of vacuum to 7 mmHg.

The liquid crystal display element had the similar performance to that in Example 1.

EXAMPLE 3

A liquid crystal display element was manufactured in the same manner as in Example 1 only except for disposing a second boat in the vessel capable of ensuring the reduced pressure in the apparatus used for injection in Example 1.

The vacant cell prepared as in Example 1 and a liquid crystal composition boat putting the liquid crystal composition were disposed in a vessel capable of withstanding the reduced pressure and, further a second boat putting n-decyl acrylate (having an opening area five times as large as that of the liquid crystal composition boat) was further disposed and the inside of the vessel was evacuated down to 1 mmHg. Subsequently, in the same procedures as those in Example 1, pressure difference is caused between the inside and the outside of the cell, the liquid crystal composition was injected through the injection port into the vacant cell and UV-rays was irradiated for 60 sec from a UV-ray irradiation device to cure the curable compound and prepare a liquid crystal display element.

The liquid crystal display element showed similar performance to that in Example 1.

Further, when the element was prepared by using the liquid crystal composition in Comparative Example 3 and containing n-hexyl acrylate in the second boat, a liquid crystal display element with the performance inferior to that of the liquid crystal display element in Example 1 but having higher transmittance in the transparent states and higher scattering degree in the scattered state than those in Comparative Example 3 could be obtained.

EXAMPLE 4

A liquid crystal display element was manufactured only changing the element used for the injection in Example 1.

The vacant cell as prepared in Example 1 and a dispenser containing a liquid crystal composition were disposed in a vessel capable of withstanding the reduced pressure and the inside of the vessel was evacuated down to 2 mmHg. Subsequently, the liquid crystal composition was dripped from the dispenser to the upwarded injection port of vacant cell, the pressure reduction in the vessel was released to cause the pressure difference between the inside and the outside of the cell, to inject the liquid crystal composition through the injection port into the vacant cell, and the UV-rays were irradiated for the 60 sec from a UV-ray irradiation device to cure the curable compound and prepare the liquid crystal display element.

The liquid crystal display element showed the similar performance to that in Example 1.

EXAMPLE 5

In the same procedures as those in Example 1, when the injection time was shortened, bubbles (air spaces left not injected with the liquid crystal composition) were formed at the periphery on the opposite side to the injection port. Depending on the cells, the injection was further proceeded and bubbles were formed at the periphery on the side of the injection port. Since bubbles were not present in the display portion, the bubbles were fixed in the peripheral portion and gave no undesired effects on the display when the composition was cured as it was in the same way as in Example 4.

For the cell in which the bubbles intruded into the display portion upon injection or during subsequent storage, when the bubbles were caused to move to the peripheral portion by applying vibrations to the cells while tilting them or pressing the substrate surface of the cells by fingers and then curing was applied in the same as in Example 4, the bubbles were fixed in the peripheral portion and gave no undesired effects on the display.

In the process for manufacturing the liquid crystal display element according to the present invention, the degree of vacuum was set to 0.5-10 mmHg, a mixture of nematic liquid crystal and the curable compound was used as the liquid crystal composition and the liquid crystal composition is injected by utilizing the pressure difference between the inside and the outside of the cell.

Accordingly, since the cell can be formed previously and alignment between the two substrate provided with electrodes can be conducted in the same manner as in usual TN type liquid crystal display elements, accurate positional alignment is possible.

Further, since the degree of vacuum is set to as a low as 0.5 to 10 mmHg as compared with conventional TN type liquid crystal display elements, fluctuations of the resin composition due to the evaporation of the low boiling monomers in the injected mixture are less caused and, thus, scattering of characteristics of the completed liquid crystal and polymer composite are less caused and, in addition, facility required for ht pressure reduction may also be simplified.

Further, the problem of the residual bubbles experienced in the conventional TN type liquid crystal display elements is scarcely caused in the present invention although the vacuum degree rate is set lower with the reason described below. That is, when the curable compound is cured to form a liquid crystal and polymer composite int he present invention, since the liquid crystal and polymer composite form a dispersion system, the bubbles, if formed, are less conspicuous and no more moved, so that there is no display failure caused by the movement of the bubbles formed in the peripheral portion through the cell to the display portion.

Further, since the liquid crystal display element requires no orientation treatment, it can provide higher productivity than that of the conventional TN type liquid crystal display elements and, since the liquid crystal and polymer composite put between the substrates is in the form of a film after curing, there is no problems such as short-circuitting between the substrates caused by the pressurization to the substrate, damages or abnormal orientation due to the movement of the spacer.

Further, since the pocket portion is formed by outwardly bulging the seal in the non-display portion apart form the injection port, the curable compound is cured while leaving the residual bubbles upon injection in the pocket portion and the bubbles, even if they are left, do not transfer to the display portion after curing, they cause no undesired effects on the display. Such advantages effect can not be obtained by the liquid crystal display element using conventional liquid nematic liquid crystal.

Furthermore, since the pocket portion can be removed by cutting after curing, it is also suitable to the reduction of the size. In addition, since the injection port and the cut portion may be sealed simultaneously in one step after curing the productivity is satisfactory.

The present invention enables various application uses within such a range as not impairing the effect of the invention.

What is claimed is:

1. A method of manufacturing a liquid crystal display cell comprising a sealed pair of substrates with peripheral portions, each substrate having an electrode thereon, and provided with an injection port, said cell having a display portion, which comprises:

sealing a pair of substrates provided with electrodes along the periphery thereof except for the area of said injection port to prepare a display cell whose periphery is not a part of the display portion of the cell and which has a vacant interior;

placing said cell in a vessel;

reducing the pressure of the atmosphere within the vessel and cell down to a pressure of 0.5 to 10 mmHg and then injecting a liquid crystal composition of a mixture of a nematic liquid crystal and a curable compound through the injection port by permitting the pressure to increase within the vessel, thereby allowing the resulting pressure increase in the vessel to force the liquid crystal composition through the injection port of the vacant interior of the cell, thereby filling the cell with the composition, which filling is accompanied by the presence of bubbles in the cell;

sealing the filled cell at the injection port; and curing said liquid crystal composition within the tightly sealed cell under conditions in which the bubbles in the cell are in the peripheral, non-display portion of the cell, thereby forming a liquid crystal-polymer matrix composite in which the nematic liquid crystal is dispersed and held within the matrix of the polymer, the relationship between the refractive index of the liquid crystal and the refractive index of the polymer matrix, when under control of an electric field applied across the pair of electrodes of the cell, being such that when there is agreement between the refractive indexes of the liquid crystal and the polymer matrix, the cell is treatment, and when there is disagreement between the refractive indexes of the liquid crystal and polymer matrix, a light-scattering state exists.

2. The method of claim 1, wherein said curable compound is a light curable compound, said liquid crystal composition is injected into the cell as a homogeneously dissolved solution, and said curable compound is exposed to light to form the liquid crystal-polymer composite.

3. The method of claim 2, wherein said curable compound is a light curable vinyl resin.

4. The method of claim 3, wherein said curable compound is a light curable acryl resin.

5. The method of claim 4, wherein said curable compound is a light curable acryl resin containing an acryl oligomer.

6. The method of claim 1, wherein said liquid crystal composition further comprises not less than 5% by weight of at least one ingredient, which, under the reduced pressure conditions of said cell, has a boiling point of greater than 60° C.

7. The method of claim 6, wherein said liquid crystal composition containing ingredients further contains low boiling ingredients which are present int he composition when the vessel is subjected to pressure reduction.

8. The method of claim 1, wherein said liquid crystal composition is brought into contact with the injection port of said cell, and subsequently, the liquid crystal composition is injected into the cell by the release of vacuum in the vessel.

9. The method of claim 8, wherein the injection of liquid crystal composition into the cell is facilitated by the admission of pressurizing gas into the vessel.

10. The method of claim 1, wherein a pocket portion is formed on the periphery of said cell by outwardly bulging the seal of the cell at the non-display portion thereof apart from the injection port of the cell, with curing of the injected composition occurring while the residual bubbles in the cell are in the pocket portion.

11. The method of claim 10, wherein said pocket portion is removed by cutting the pocket form the cell.

12. A method of manufacturing a liquid crystal display cell comprising a sealed pair of substrates with peripheral portions, each substrate having an electrode thereon, and provided with an injection port, said cell having a display portion, which comprises:

sealing a pair of substrates provided with electrodes along the periphery thereof except for the area of said injection port to prepare a display cell whose periphery is not a part of the display portion of the cell and which has a vacant interior;

placing said cell in a vessel;

reducing the pressure of the atmosphere within the vessel and cell down to a pressure of 0.5 to 10 mmHg and then injecting a liquid crystal composition of a mixture of a nematic liquid crystal, a curable compound and not less than 5% by weight of at least one ingredient which, under the pressure of the cell, has a boiling point of greater than 60° C. through the injection port by permitting the pressure to increase within the vessel, thereby allowing the resulting pressure increase int he vessel to force the liquid crystal composition through the injection port of the vacant interior of the cell, thereby filling the cell with the composition, which filling is accompanied by the presence of bubbles in the cell;

sealing the filled cell at the injection port; and curing said liquid crystal composition within the tightly sealed cell under conditions in which the bubbles in the cell are in the peripheral, non-display portion of the cell, thereby forming a liquid crystal-polymer matrix composite in which the nematic liquid crystal is dispersed and held within the matrix of the polymer, wherein the refractive index of the matrix resin substantially agrees with the ordinary refractive index ($n_o$) of the liquid crystal.

13. The method of claim 12, wherein said curable compound is a light curable compound, said liquid crystal composition is injected into the cell as a homogeneously dissolved solution, and said curable compound is exposed to light to form the liquid crystal-polymer composite.

14. The method of claim 12, wherein said curable compound is a light curable acryl resin.

15. A method of manufacturing a liquid crystal display cell comprising a sealed pair of substrates with peripheral portions, each substrate having an electrode thereon, and provided with an injection port, said cell having a display portion, which comprises:

sealing a pair of substrates provided with electrodes along the periphery thereof except for the area of said injection port to prepare a display cell whose periphery is not a part of the display portion of the cell and which has a vacant interior;

placing said cell in a vessel;

reducing the pressure of the atmosphere within the vessel and cell down to a pressure of 0.5 to 10 mmHg and then injecting a liquid crystal composition of a mixture of a nematic liquid crystal, a curable compound and not less than 5% by weight of at least one ingredient which, under the pressure of the cell, has a boiling point of greater than 60° C. through the injection port by permitting the pressure to increase within the vessel, thereby allowing the resulting pressure increase int he vessel to force the liquid crystal composition through the injection port of the vacant interior of the cell, thereby filling the cell with the composition, which filling is accompanied by the presence of bubbles in the cell which are positioned in the peripheral, non-display portion of the cell; and curing said liquid crystal composition within the tightly sealed cell, thereby forming a liquid crystal-polymer composite in which the nematic liquid crystal is dispersed and held within the resin matrix of the polymer, wherein the refractive index of the resin matrix substantially agrees with the ordinary refractive index ($n_o$) of the nematic liquid crystal.

16. The method of claim 15, wherein the injected curable composition is cured when the bubbles are present and fixed in the peripheral portion of the cell on the side opposite the injection port.

17. A method of manufacturing a liquid crystal display cell, comprising a sealed pair of substrates with peripheral portions, each substrate having an electrode thereon, and provided with an injection port, said cell having a display portion, which comprises:

sealing a pair of substrates provided with electrodes along the periphery thereof except for the area of said injection port to prepare a display cell whose periphery is not a part of the display portion of the cell, which seal outwardly bulges in the non-display portion of the cell apart from the injection port, said cell having a vacant interior;

placing said cell in a vessel;

reducing the pressure of the atmosphere within the vessel and cell and then injecting a liquid crystal composition of a mixture of a nematic liquid crystal and a curable compound through the injection port by permitting the pressure to increase within the vessel, thereby allowing the resulting pressure increase int he vessel to force the liquid crystal composition through the injection port of the vacant interior of the cell which is under reduced pressure, thereby filling the cell with the composition, which filling is accompanied by the presence of residual bubbles in the cell; and curing said liquid crystal composition within the tightly sealed cell, thereby forming a liquid crystal-polymer composite in which the nematic liquid crystal is dispersed and held within the resin matrix of the polymer and in which the residual bubbles are left in the pocket formed by the outward bulging of said seal, the relationship between the refractive index of the liquid crystal and the refractive index of the resin matrix, when under control of an electric field applied across the pair of electrodes of the cell, being such that when there is agreement between the refractive indexes of the liquid crystal and the resin matrix, the cell is transparent, and when there is disagreement between the refractive indexes of the liquid crystal and the resin matrix, a light-scattering state exists.

18. The method of claim 17, wherein curing of the curable compound is conducted after displacing the bubbles into the pocket portion of the cell.

19. The method of claim 17, wherein the pocket portion of the cell is removed by cutting.

20. The method of claim 19, wherein the pocket portion of the cell is removed by cutting after the curable compound is cured.

* * * * *